United States Patent Office 3,687,863
Patented Aug. 29, 1972

3,687,863
OPTICAL FILTERS CONTAINING TETRAPHENYL-
PORPHINS AND METHOD OF MAKING SAME
Paul Wacher, Bayside, N.Y., assignor to General Telephone & Electronics Laboratories, Incorporated
Filed May 25, 1970, Ser. No. 41,133
The portion of the term of the patent subsequent to
Jan. 25, 1989, has been disclaimed
Int. Cl. G02b 5/70
U.S. Cl. 252—300                           12 Claims

ABSTRACT OF THE DISCLOSURE

Selective optical absorption filters are disclosed which consist of polymeric matrices containing metal derivatives of porphin. In a preferred embodiment of the invention the polymeric matrix is an acrylic ester polymer and it contains at least one metal derivative of tetraphenylporphin.

BACKGROUND OF THE INVENTION

This invention relates to optical filters and, more particularly, to selective optical absorption filters comprising metallo-organic materials in a polymeric matrix.

Selective optical absorption filters are used in conjunction with video displays, photographic equipment, analytical equipment and in other applications. The term "selective optical absorption filter" as used herein is defined as a medium which substantially absorbs certain selected light wavelengths while substantially transmitting other light wavelengths. The term "light" is intended to include the visible region of the electromagnetic spectrum as well as the near ultraviolet and near infrared regions.

In various applications it is desirable for a selective optical filter to exhibit an absorption spectrum having a steeply sloping characteristic. Such a filter is referred to as being "highly selective." For example, a filter may be required to transmit only a narrow band of wavelengths or to absorb the wavelengths above a given cutoff wavelength. In practice, however, it is difficult to achieve high selectivity without sacrificing the quality of other filter parameters. The most common sacrifice is severe attenuation of the transmission of wavelengths which are to be passed by the filter. As a general rule, filters which are designed to be highly selective give relatively poor transmission of wavelengths which are near the absorbed wavelengths.

There are a number of commercially available absorption filters which offer relatively high selectivity. The available filters are limited in number, however and, for a given application, the chances of finding a good filter "match" are not good Therefore, a need exists for a family of highly selective filters to fill gaps in the presently available catalogue of filters.

The development of new filter materials necessarily involves the use of absorbers having appropriate spectral characteristics. Much more than this is required, however, in obtaining a usable optical filter. The filter must be embodied in a physical form which makes its use practical. Thus, for example, a liquid absorber which cannot be put in a solid durable form would not likely make a practical television display filter. Some materials which have favorable spectral characteristics in solution must be eliminated from consideration as practical filter candidates because they do not have sufficient absorptivity at their maximum solubility in a given solid matrix, or because their spectral properties are altered or destroyed upon incorporation in a given solid matrix. Another basic requirement of a practical optical filter is stability. The optical properties of a useful filter must not be substantially degraded in short time periods by light or other environmental factors. Unfortunately, many absorbers which have favorable spectral characteristics are unstable and degrade badly when exposed to sunlight or ordinary incandescent or fluorescent light.

Accordingly, it is an object of the present invention to provide a family of highly selective optical filters which are relatively stable and which can be embodied in useful and durable form.

BRIEF SUMMARY OF THE INVENTION

The present invention is directed to a selective optical absorption filter comprising a polymeric matrix which contains a metal derivative of a porphin. In a preferred embodiment of the invention the polymeric matrix is an acrylic ester polymer which contains at least one metal derivative of tetraphenylporphin.

The family of filters disclosed herein have absorption spectra which depend upon the particular porphins employed and these absorption spectra have peaks which range over the visible spectrum. As will be demonstrated hereinafter the filters are generally stable and are embodied in a form convenient for practical use.

Further features and advantages of the invention will become more readily apparent from the following detailed description when taken in conjunction with the accompanying drawings.

DESCRIPTION OF THE PREFERRED EMBODIMENTS

Figure 1:
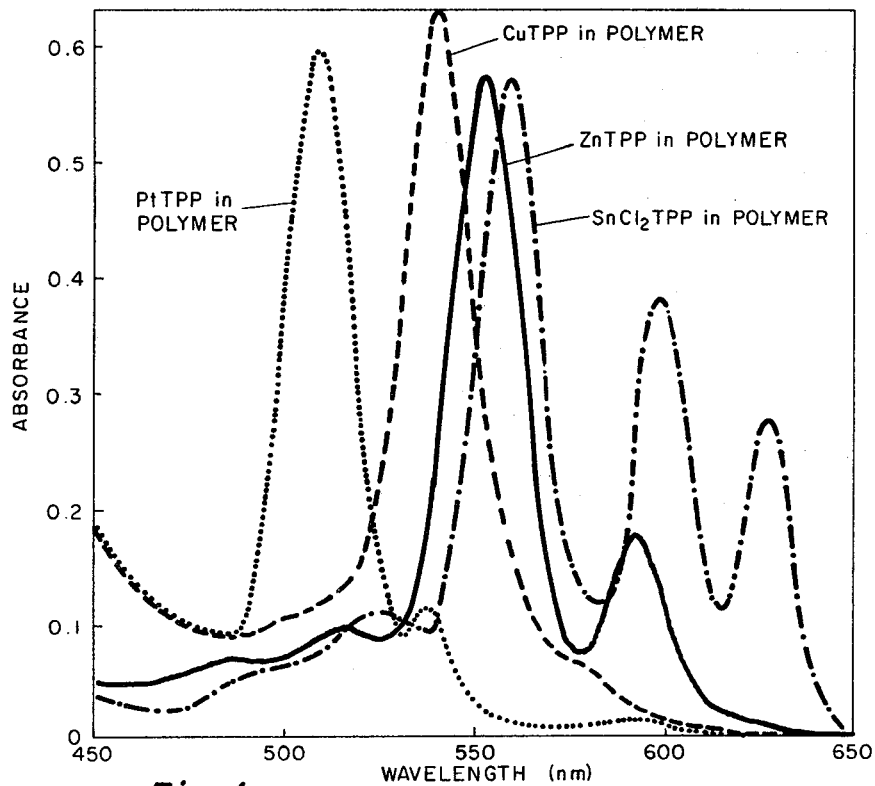
FIG. 1 is a graphical representation of the absorption spectra of certain optical filters in accordance with the invention.

The porphyrins are tetrapyrrolic macrocycles in which the pyrrole rings are linked by methene carbons in a closed, highly conjugated system. Porphyrins are widely distributed in nature with blood and urine being examples of biological materials which contain porphyrins. Porphin, which has the structure

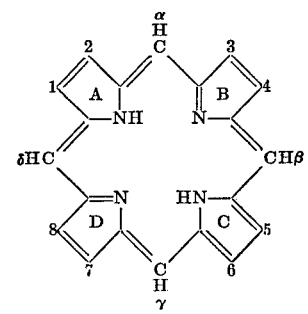

is a parent nucleus of the porphyrins and is capable of carrying substituents in positions 1 to 8 on the pyrrole rings or in the meso positions $\alpha$ to $\delta$. Tetraphenylporphin (TPP) is a porphin having phenyl groups at the $\alpha$, $\beta$, $\gamma$ and $\delta$ positions. When a metal complex (M) replaces the two inner hydrogens a metal derivative of TPP (also known as a metallo-derivative of TPP or a metal chelate of TPP) is obtained which has the form

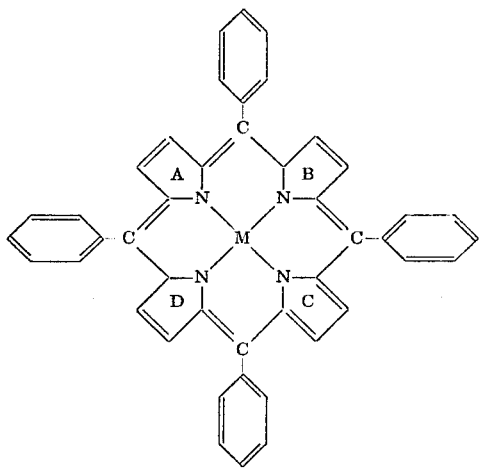

The metal chelates of TPP can be synthetically produced and, since some of them are chemically related to important biological substances such as hemin and chlorophyll, they have been studied as model compounds for the elucidation of the mechanisms of oxygen transport in blood and photosynthesis in plants. The metal chelates of TPP are known to be generally slightly soluble (of the order of about $10^{-3}$ molar) in conventional organic solvents such as benzene, chloroform, etc. and are also known to exhibit strong and sharp light absorption bands in the visible and ultraviolet (UV) regions of the spectrum. The strongest absorption bands for these chelates occur in the near-UV and blue regions of the spectrum and are known as the Soret bands. These bands have peak molar absorptivities ($\epsilon$) of the order of about $10^5$ liters-mole$^{-1}$-cm.$^{-1}$. (Molar absorptivity, $\epsilon$, is defined by $$\epsilon = \frac{A}{Lc}$$

where A is the absorbence, L is the path length, and $c$ is the molar concentration of the material.) The visible absorption bands of these chelates have peak molar absorptivities which are about an order of magnitude less than those of their Soret bands, but it is the sharp visible absorption bands which are of primary interest herein. The measured molar absorptivities of some metal and metal complex chelates of TPP (in benzene solutions) at their peak visible absorption wavelengths, are listed in the following table:

| Chelate (in benzene) | max. (nm.) | $\epsilon$ (liters-mole-$^1$-cm.-$^1$) |
|---|---|---|
| CuTPP | 540 | 2.14×10⁴ |
| NiTPP | 529 | 1.64×10⁴ |
| PtTPP | 510 | 2.78×10⁴ |
| ZnTPP | 550 | 2.17×10⁴ |
| Zn·PyTPP | 603 | 1.03×10⁴ |
|  | 563 | 1.95×10⁴ |
| FeOHTPP | 570 | 0.45×10⁴ |
| FeClTPP | 509 | 1.20×10⁴ |
| MnClTPP | 617 | 0.89×10⁴ |
|  | 582 | 0.87×10⁴ |
|  | 473 (Soret) | 9.6×10⁴ |
| VOTPP | 548 | 2.21×10⁴ |
|  | 628 | 0.83×10⁴ |
| SnCl₂TPP | 602 | 1.15×10⁴ |
|  | 562 | 1.70×10⁴ |
| AuCl·2HClTPP | 531 | 1.59×10⁴ |

The metal chelates of TPP, like most porphyrins, form solutions which are relatively unstable to light. This instability is believed due to photo-oxidation and/or photo-reduction reactions. The stability and general physical properties of metalloporphins are detailed in a book entitled "Porphyrins and Metalloporphyrins," by J. E. Falk, Elsevier Publishing Co. (1964).

It has been discovered that when metal chelates of TPP are incorporated in certain polymeric matrices novel and practical selective optical filters are obtained. This is due, at least in part, to the satisfaction of the following conditions:

(1) The metal chelates of TPP are sufficiently soluble in the polymers to yield practical filtering characteristics. The filters can be made relatively thin and still effective because of the high intrinsic absorptivity of the chelates.

(2) The absorption spectra of the chelates are not substantially altered upon their incorporation in the polymers.

(3) The resultant filters are relatively stable in environments of artificial light or sunlight.

Some polymers, such as the thermo-setting resins, could not be successfully employed as filter matrices in the present invention. In most cases it was found that cross-linking or catalytic agents required to produce a solid matrix from a monomer or prepolymer had a destructive effect on the metal chelate of TPP incorporated in the monomer or prepolymer. An exception was found to be CuTPP which was successfully incorporated in a thermo-setting resin (see Example 1 below).

In the preferred embodiments of the invention the metal chelates of TPP are incorporated in thermoplastic polymeric matrices. It was discovered that when acrylic ester polymers are used to incorporate the chelates the three conditions listed above are met. The acrylic ester polymers containing the chelates can be conveniently applied to a substrate by spraying or dipping, and they form clear and durable highly selective optical filter coatings.

The filters of this invention can be made by adding a benzene solution of a metal chelate of TPP to a solution of acrylic ester polymer in ethylene glycol monomethyl ether. The resultant solutions are applied to a clear glass substrate and heated to remove the solvents and produce a dry acrylic ester polymer film which incorporates the metal chelate of TPP. This film-on-glass combination can be utilized as a selective optical filter, or, if desired, the polymer film can be peeled from the substrate and utilized separately.

The combination of various metal derivatives of TPP in a single polymeric matrix gives rise to useful selective optical filters. A solid state light source which utilizes a combination of metal deriative of TPP in a polymeric matrix is disclosed in my copending U.S. application Ser. No. 40,940, filed of even date herewith and assigned to applicant's assignee. A high-contrast display apparatus which utilizes these materials is disclosed in my copending U.S. application Ser. No. 41,134, now U.S. Pat. No. 3,638,060, also filed of even date herewith and assigned to the same assignee. In both of these referenced applications a polymeric matrix containing MnClTPP is utilized, at least in part, for its strong Soret absorption band in the blue region of the spectrum.

Some of the optical filters of the present invention were found to be adversely affected by the ultraviolet (UV) component of ambient light. The stability of these filters is substantially improved, however, when a protective coating of UV-screening agent is employed (see Examples 2–11).

The examples which follow are preceded by a description of the methods used to prepare the various metal derivatives of TPP utilized in this invention. Each derivative was made from free base TPP which was synthetically prepared.

Synthesis of metallo-derivatives of TPP: Preparation of free-base TPP

Tetraphenylporphin (TPP) was synthetized by placing 1.2 liters of reagent grade propionic acid in a three-necked reaction flask fitted with a water-cooled reflux condenser, addition funnel, and thermometer. The acid was refluxed and 22 ml. of freshly distilled pyrrole was added, followed by 33 ml. of reagent grade benzaldehyde. The reflux was continued for 30 minutes and the mixture was allowed to cool to room temperature. The resultant deep purple crystals were vacuum filtered on a Büchner funnel. The crystals were thoroughly washed with hot distilled water and then with methanol. The process produced 6.44 grams of TPP, representing a yield of about 13 percent. Combustion analysis of the synthesized material versus calculated weight percent gave the following result:

|  | Weight percent (measured) | Weight percent (theoretical) |
| --- | --- | --- |
| Carbon | 85.98 | 85.97 |
| Hydrogen | 4.90 | 4.92 |
| Nitrogen | 9.41 | 9.11 |

Divalent metal chelates of TPP

Copper derivative (or chelate) of TPP (CuTPP) was prepared by refluxing copper acetate with a glacial acetic acid solution of TPP. An excess of 10 percent of copper acetate over the stoichiometrically required amount was needed to drive the reaction to completion. The course of the reaction was followed by periodically removing a small sample of the reaction mixture and recording its absorption spectrum. The reaction was considered complete when the free-base TPP bands had vanished. The acetic acid and unreacted inorganic salts were removed from the reaction mixture by solvent extraction of the copper chelate from benzene/water. The benzene solutions were freed from water by drying over anhydrous $Na_2SO_4$. The benzene was removed by distillation under reduced pressure and the solid remainder redissolved in chloroform. Methanol was slowly added to the chloroform and the solid chelate that crystallized was filtered, washed with fresh methanol and dried in vacuum at 60° C.

Nickel chelate of TPP (NiTPP) was prepared in the same manner as the copper chelate except that a 200 percent excess of nickel acetate over the stoichiometrically required amount was used.

Zinc chelate of TPP (ZnTPP) was prepared in the same manner as the copper and nickel chelates by using a 10 percent excess of zinc acetate. In this instance, however, pyridine was used as the reaction solvent instead of glacial acetic acid. Then a zinc-pyridine chelate of TPP (ZnPyTPP) was also prepared by dissolving solid recrystalized zinc TPP chelate in pyridine and removing the solvent by evaporation.

Platinum chelate of TPP (PtTPP) was prepared by adding a mixture of potassium chloroplatinite and sodium acetate dissolved in distilled water to TPP refluxing in a mixed solvent of glacial acetic acid and benzene. A five-fold excess of the platinum salt was used. The colloidal platinum metal was filtered off and the crystalline material recovered was purified as was indicated for the above divalent metal chelates. In this case, however, the benzene solution was chromatographed on a talc column before removal of the benzene.

Trivalent metal chelates of TPP

Three trivalent iron complexes as well as the manganese complex were prepared by autooxidation of the divalent metals rather than by direct insertion of the trivalent metal ions into TPP. The oxidation of the ferrous ion is so rapid that special care was taken to ensure that the reactive ferrous ions were transferred to the refluxing TPP solution without first oxidizing to ferric ions. This was done by dissolving the high purity metal in nitrogen-purged glacial acetic acid and transferring the solution to the refluxing TPP by means of a hydrostatically controlled nitrogen transfer line. The resulting iron acetate chelate was used to prepare iron hydroxide and iron chloride chelates of TPP.

The iron hydroxide chelates (FeOHTPP) was made by shaking a benzene solution of the iron acetate chelate with 0.01 molar aqueous sodium hydroxide in a separatory funnel. The lower aqueous layer was removed and the benzene layer, containing the chelate, was washed repeatedly with distilled water until a phenolphthalein test indicated that the excess sodium hydroxide had been removed. The volume of benzene was reduced and the iron hydroxide chelate was recrystallized from chloroform/methanol as described above.

The iron chloride chelate (FeClTPP) was prepared by shaking a benzene solution of the iron hydroxide chelate with concentrated HCl in a separatory funnel. The excess HCl was washed out with distilled water and the solid chelate was recrystallized from chloroform/methanol as above.

Manganese chloride chelate of TPP (MnClTPP) was made by placing manganous chloride, sodium acetate and free-base TPP in a reaction flask containing a mixture of chloroform and glacial acetic acid. The mixture was refluxed until spectral examination indicated the reaction was complete. The reaction solvents were distilled off at reduced pressure and the solid product was washed first with acetic acid and then with cold water. Because of its high methanol solubility, this chelate could not be crystallized as was done above. Instead, a micro-Soxhlet extraction apparatus was used to extract the chelate with ether.

Gold chloride chelate of TPP (AuCl·2HClTPP) was prepared by dissolving gold chloride, sodium acetate and TPP in a solvent consisting of equal parts of chloroform and glacial acetic acid. The chloroform was distilled off and the acetic acid solution refluxed until the reaction was complete. A 1:9 chloroform-benzene solution of the impure chelate crystals was passed through an alumina column and the unreacted free base was eluted from the column with benzene. The pure chelate was retained on the alumina. It was physically removed and the chelate dissolved with methanol. Pure chelate crystals were obtained by precipitation with petroleum ether.

Tetravalent metal chelates of TPP

Vanadyl chelate of TPP (VOTPP) was prepared by dissolving TPP and a stoichiometric excess of vanadyl sulfate in a mixed solvent consisting of 1 part pyridine, 1 part dioxane and 2 parts glacial acetic acid. The chelate and remaining free base were extracted into benzene, water washed and dried. The excess free base was removed by chromatographic passes on a talc column using chloroform as eluant. Methanol was added to the chloroform solution and the red chelate crystals were recovered by centrifugation.

Tin dichloride chelate of TPP ($SnCl_2TPP$) was prepared using stannous chloride in a manner similar to the preparation of the manganese chelate described above. In this case the solvent was removed by evaporation, and after vacuum drying, chelate crystals having a bluish-purple color were recovered.

EXAMPLE 1

1 mg. of CuTPP was added to 34 gms. of (Maraset 658) epoxy resin and thoroughly mixed. The mixture was heated at about 100° C. for 20 minutes until the chelate was completely dissolved. The solution was allowed to cool to room temperature and 17 gms. of (Maraset 558) amine catalyst was added and thoroughly mixed in. After outgassing at 25° C. in a vacuum oven the solution was poured into a cylindrical Teflon mold 1" in diameter by 1" in height. The resin was allowed to cure to hardness for about 16 hours at 25° C. and was then given a 1 hour post-cure at 60° C. The orange-colored epoxy cylinder was then removed from the mold and wafers were prepared by slicing 1/8" thick segments of the cylinder on a diamond cutting wheel. The wafer faces were then optically polished and the resultant optical filters were tested on a recording spectrophotometer. The filters were found to have substantially the same spectral characteristics as a solution of CuTPP in benzene, having an absorption peak in the visible at about 540 nm. The CuTPP-epoxy filter was found to have excellent stability. The filter was exposed to 290 ft.-candles of tungsten light for 312 hours (approximately 90,000 foot-candle hours). The peak filter absorbence in the visible exhibited no measurable degradation after this exposure.

The above method was used without success in attempting to make filters in epoxy resin with PtTPP, NiTPP, ZnTPP, and Zn·PyPP chelates. In each case the spectral properties of the chelate material were found to be partially or completely destroyed after the addition of amine catalyst. It was further attempted to make filters in epoxy in accordance with this method by using an acid anhydride catalyst and also by using a Lewis acid catalyst ($BF_3$). These catalysts were tried in conjunction with the PtTPP, NiTPP, and ZnTPP chelates and it was again found that in each case the catalyst ruined the useful spectral properties of the chelate.

EXAMPLES 2–11

Selective optical filters were made with each of the following chelates: CuTPP, NiTPP, PtTPP, ZnTPP, Zn·PyPP, FeClTPP, VOTPP, AuCl·2HClTPP, MnClTPP, and $SnCl_2TPP$. A solution consisting of about 0.1% by weight of a TPP chelate in benzene was added to a 10% by weight solution of acrylic ester polymer in ethylene glycol monomethyl ether (E.G.M.E.). The solutions were applied to glass substrates in thickness ranging up to about 3 mils. The coated glass substrates were then heated in air for about one hour at 145° C. to remove the solvents and produce a dry acrylic ester polymer film. The absorption spectra of the resultant optical filters were taken on a recording spectrophotometer and in each case it was found that the shape of the absorption spectrum of the filters were substantially the same as those of the corresponding chelate-in-benzene solutions. The absorption spectra of some of these filters are shown in FIG. 1.

Figure 2:
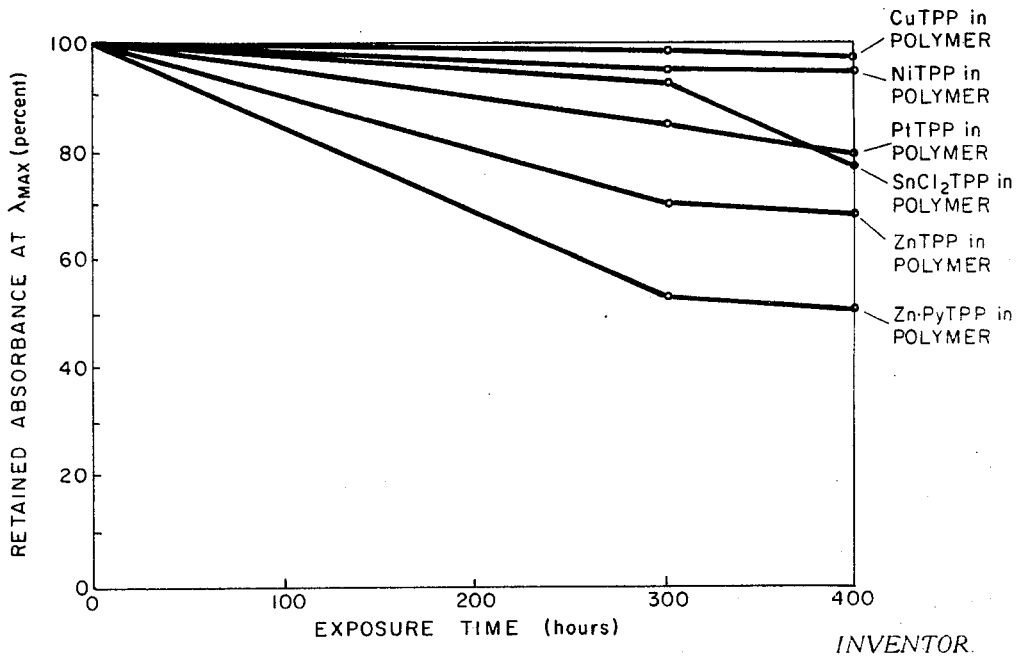
FIG. 2 is a graphical representation of the retained absorbence of certain filters in accordance with the invention after such filters were exposed to tungsten lamp illumination.

Certain of the filters were exposed to 300 foot candles of tungsten lamp illumination for a period of 400 hours. FIG. 2 indicates the percentage of retained peak absorbence of the filters containing the chelates of copper, nickel, platinum, tin dichloride, zinc, and zinc pyridine as measured after 300 hours and 400 hours of exposure.

The filters containing the chelates of vanadium, gold and manganese chloride were exposed to direct sunlight for 100 hours. Additional samples of the filters were also exposed in this manner but these samples were first precoated at follows: 0.2% by weight of a substituted benzotriazole UV screening agent (Geigy Tinuvin–328) was dissolved in a 10% solution of acrylic ester polymer in E.G.M.E. The filters were spray-coated with this solution and then air-oven baked for 1.5 hours at 145° C. The resultant UV screen coatings were approximately 2.5 mils thick. The following table indicates the percentage of retained absorbence (at about the peak absorbing visible wavelength) for the filters with and without the UV screen coatings:

| Filter | Percent of absorbence retained | |
|---|---|---|
| | With UV screen coating | Without UV screen coating |
| VOTPP in polymer (548 nm.) | 100 | 68 |
| MnClTPP in polymer (582 nm.) | 97 | 70 |
| AuCl.2HClTPP in polymer (523 nm.) | 82 | 54 |

EXAMPLE 12

The following benzene solutions of metalloporphyrins were prepared:

(a) 0.5 mg. PtTPP/ml. benzene
(b) 1.0 mg. $SnCl_2TPP$/ml. benzene
(c) 1.0 mg. MnClTPP/ml. benzene These solutions were each added to a 40% solution of acrylic ester polymer in E.G.M.E. and additional amounts of E.G.M.E. were added to improve the spraying properties of the three solutions which then consisted of the following:

(A) Parts by weight

| | |
|---|---|
| PtTPP in benzene | 2.5 |
| 40% polymer in E.G.M.E. | 1.0 |
| E.G.M.E. | 1.0 |

(B)

| | |
|---|---|
| $SnCl_2TPP$ in benzene | 1.5 |
| 40% polymer in E.G.M.E. | 1.0 |
| E.G.M.E. | 2.0 |

(C)

| | |
|---|---|
| MnClTPP in benzene | 1.5 |
| 40% polymer in E.G.M.E. | 1.0 |
| E.G.M.E. | 2.0 |

The solutions were sprayed on a glass substrate in the order A, B, C. After each component was applied the coating was dried by air oven baking at 145° C. for 1 hour. A coating of UV screening agent was then applied as described in the previous examples. The resultant optical filter exhibited a sharp cutoff transmission characteristic, absorbing visible wavelengths below about 630 nm. while transmitting long wavelengths.

EXAMPLE 13

The following benzene solutions were prepared:

(a) 0.5 mg. PtTPP/ml. benzene
(b) 1.0 mg. MnClTPP/ml. benzene
(c) 1.0 mg. blue dye/ml. (1:1 benzene/E.G.M.E.) (solvent blue 48)

The following spraying solutions were prepared from these in the manner described in Example 12:

(A) Parts by weight

| | |
|---|---|
| PtTPP in benzene | 1.5 |
| 40% polymer in E.G.M.E. | 1.0 |
| E.G.M.E. | 2.0 |

(B)

| | |
|---|---|
| MnClTPP in benzene | 2.5 |
| 40% polymer in E.G.M.E. | 1.0 |
| E.G.M.E. | 1.0 |

(C)

| | |
|---|---|
| Dye solution | 2.5 |
| 40% polymer in E.G.M.E. | 1.0 |
| E.G.M.E. | 1.0 |

The solutions were sprayed on a neodymium-containing glass substrate (5.5 mm. thick Corning #5120) in the order A, B, C and after each component was applied the coating was dried by air oven baking at 145° C. for one hour. A coating of UV screening agent was then applied as described in the previous example. The resultant optical filter exhibited a narrow band transmission characteristic. The filter had a transmission band centered at about 550 nm. in the green. The filter substantially absorbed visible wavelength outside the green.

What is claimed is:

1. An optical filter comprising a polymeric matrix which contains at least one metal derivative of a tetraphenylporphin, said metal derivative having the formula:

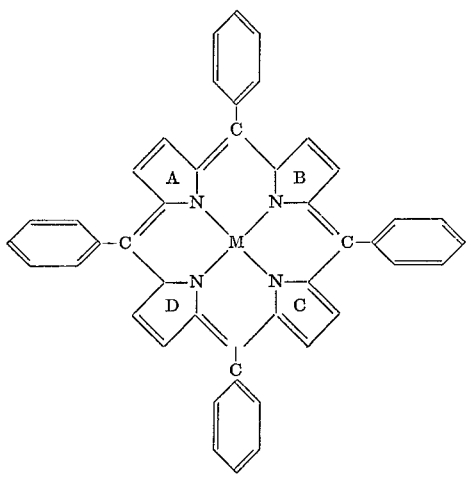

wherein Me represents the metallic component.

2. An optical filter as defined by claim 1 wherein said metallic component is selected from the group consisting of copper, nickel, platinum, zinc, zinc-pyridine, ferrous chloride, vanadyl, gold chloride·2HCl, tin chloride, and manganese chloride.

3. An optical filter as defined by claim 2 wherein said polymeric matrix is a thermoplastic material.

4. An optical filter as defined by claim 2 wherein said polymeric matrix is an acrylic ester polymer.

5. An optical filter as defined by claim 1 wherein said polymeric matrix is epoxy resin and said metal derivative is CuTPP.

6. An optical filter comprising a first layer of optical filter material as defined by claim 1 and a second layer of ultraviolet screening agent coated on said first layer.

7. An optical filter as defined by claim 6 additionally comprising a transparent substrate upon which said first and second layers are coated.

8. An optical filter as defined by claim 1 wherein said polymeric matrix is an acrylic ester polymer and wherein said acrylic ester polymer contains the platinum, tin chloride and manganese chloride derivatives of the tetraphenylporphin defined in claim 1.

9. An optical filter as defined by claim 1 including a neodymium-containing substrate and a layer of material coated thereon, said material being an acrylic ester polymer which contains the platinum and manganese chloride derivatives of the tetraphenylporphin defined in claim 1.

10. The method of making an optical filter which comprises the steps of:
  (a) dissolving a metal derivative of the tetraphenylporphin of claim 1 in a solvent therefor,
  (b) adding the tetraphenylporphin solution to a solution of a thermoplastic polymer in a solvent for said polymer,
  (c) applying a coating of the resultant solution to a substrate, and
  (d) heating the coating to remove said solvents.

11. The method of claim 10 further including the step of stripping the resultant coating from the substrate.

12. An optical filter as defined in claim 6 wherein said ultraviolet screening agent comprises a benzotriazole-related material.

References Cited

UNITED STATES PATENTS

| | | | |
|---|---|---|---|
| 3,291,746 | 12/1966 | Donoian et al. | 252—300 |
| 2,850,505 | 9/1958 | Hein | 260—314 |
| 3,063,780 | 11/1962 | Rösch et al. | 8—1 |
| 3,238,221 | 3/1966 | Schmitz et al. | 260—314.5 |
| 2,681,346 | 6/1954 | France et al. | 260—314 |

GEORGE F. LESMES, Primary Examiner

M. B. WITTENBERG, Assistant Examiner

U.S. Cl. X.R.

260—314; 350—160 R